United States Patent
Steffen et al.

[11] Patent Number: 5,819,512
[45] Date of Patent: Oct. 13, 1998

[54] APPARATUS AND METHOD FOR SENSING MATERIAL BUILD-UP

[75] Inventors: Ronald E. Steffen, Springfield; Ernie J. Poani, Taylorville; David E. Steffen, Chatham, all of Ill.

[73] Assignee: DICKEY-john Corporation, Auburn, Ill.

[21] Appl. No.: 822,268

[22] Filed: Mar. 20, 1997

[51] Int. Cl.⁶ .................................................. A01D 46/08
[52] U.S. Cl. ............. 56/10.2 R; 56/10.2 J; 56/DIG. 15; 56/30; 340/684; 460/1
[58] Field of Search .................... 56/30, 40, 41, 56/50, 10.2 R, 10.2 J, DIG. 15; 340/684, 608, 665; 460/1, 2

[56] References Cited

U.S. PATENT DOCUMENTS

| | | | |
|---|---|---|---|
| 4,286,424 | 9/1981 | Hubbard | 56/10.2 |
| 4,531,118 | 7/1985 | Beams | 340/684 |
| 4,635,047 | 1/1987 | Fox et al. | 340/608 |
| 4,905,897 | 3/1990 | Rogers et al. | 340/608 |
| 5,015,997 | 5/1991 | Strubbe | 340/684 |
| 5,063,729 | 11/1991 | Fox et al. | 56/30 |
| 5,078,645 | 1/1992 | Bohman et al. | 460/2 |
| 5,083,976 | 1/1992 | McClure et al. | 460/1 |
| 5,408,817 | 4/1995 | Wagstaff | 56/341 |
| 5,500,641 | 3/1996 | Roberts | 340/665 |
| 5,544,474 | 8/1996 | Finkelstein | 56/10.2 A |
| 5,605,033 | 2/1997 | Olmr | 56/10.2 R |

FOREIGN PATENT DOCUMENTS

| | | | |
|---|---|---|---|
| 490711 | 3/1977 | Australia | 340/684 |
| 0020521 | 2/1979 | Japan | 56/10.2 R |
| 0639489 | 12/1978 | U.S.S.R. | 56/41 |
| 0655352 | 10/1979 | U.S.S.R. | 340/684 |
| 1463172 | 3/1989 | U.S.S.R. | 56/30 |
| 1199238 | 7/1970 | United Kingdom | 340/684 |
| WO88/09543 | 12/1988 | WIPO | 340/665 |

*Primary Examiner*—Michael J. Carone
*Assistant Examiner*—Fredrick T. French, III
*Attorney, Agent, or Firm*—Leydig, Voit & Mayer, Ltd.

[57] ABSTRACT

An apparatus and method is disclosed for sensing material build-up, such as the undesirable build-up of cotton in a mechanized cotton harvester. A tube is mounted for eccentric rotation adjacent an area where build-up occurs, such as near a doffer. The tube is biased by a spring into one position and is eccentrically rotated against the spring by forces applied to the tube by accumulating material, such as cotton. A switch is mounted within the tube, and, as the tube rotates, the state of the switch changes in accordance with the rotation. A signal generated by the switch is used to alert an operator.

7 Claims, 5 Drawing Sheets

APPARATUS AND METHOD FOR SENSING MATERIAL BUILD-UP

FIELD OF THE INVENTION

The present invention relates generally to a system and method for sensing cotton build-up in the area of a doffer column in a cotton picker/harvester.

BACKGROUND OF THE INVENTION

Mechanized cotton pickers or harvesters remove cotton from cotton plants and deposit the removed cotton into a basket or receptacle. The cotton is picked from cotton plants by a picking unit on the harvester which is comprised of individual row units.

The individual row units on a picking unit are operable to separate cotton from cotton plants as the harvester travels through a field of cotton plants. The movement of the harvester through the field introduces cotton stalks into a row unit via stalk lifters which are mounted to the front of the row unit. The cotton stalks are then directed rearwardly through the row unit where spindles on picker drums physically separate cotton from cotton plant stalks. Doffer columns then remove the cotton from the spindles on the picker drums. The doffer columns subsequently feed the separated cotton into an air stream for ultimate depositing in a cotton basket.

During operation, conditions may arise which are potentially dangerous, such as a fire, and could damage the machine. For example, cotton stalks or other debris can block the air stream, and the cotton that is separated from the spindles may not be blown clear of the doffer area. If the air stream is blocked in this manner, the separated cotton will rapidly accumulate in the spaces surrounding the doffer columns. This accumulated cotton may be either compacted into these spaces by the rotation of the doffer column or dragged along with the doffer column. Either of these conditions is dangerous because the accumulated cotton will cause frictional forces to build against the doffer columns which may, in a worst case, cause a fire. Additionally, the accumulated cotton will interfere with the normal operation of the row unit, and the other cotton picking and separating mechanisms will also malfunction. Given the potentially dangerous conditions, it is desirable for an operator to know when cotton has accumulated on or about the doffer columns beyond an acceptable level.

One type of existing sensor for sensing cotton build up in the doffer column area consists of a limit switch and two metal plates connected by a flexible rubber material. One plate is fixedly mounted to the frame of the row unit while the other plate is movably mounted near the doffer column. As cotton builds up in the doffer column area, the cotton deflects the movable plate mounted near the doffer column. Once the movable plate is sufficiently deflected, the limit switch is triggered which, in turn, indicates that cotton build-up has exceed a desirable level.

This plate type of sensor is problematic because, due to its construction, it may give intermittent false indications. Also, key components such as switches and the like are exposed and are susceptible to corrosion.

OBJECTS AND SUMMARY OF THE INVENTION

It is therefore the general object of the present invention to provide an apparatus which accurately detects cotton build-up in the doffer column area.

It is a further object of the invention to provide an apparatus for sensing cotton build-up in the doffer column area without extensive or expensive modification to the picking unit.

Yet another object of the invention is to reduce false indications of cotton build-up in the doffer column area.

The foregoing and other objects and advantages are accomplished by the present invention which, among other things, uses a generally cylindrically shaped tube with an internal switch. The tube is eccentrically and movably mounted in a picking unit in a location which permits the tube to contact cotton which may accumulate in the doffer column area. The tube is biased toward the doffer column by a spring located within the tube. As cotton accumulates on or near the doffer column, the build-up will overcome the biasing force of the spring and the tube will rotate in an arcuate motion away from its initial position. Once the tube rotates through a predetermined angular distance, the switch within the tube is closed thereby signaling an undesirable accumulation of cotton in the areas around doffer column. The closing of the switch may initiate further action such as illumination of a warning light to alert an operator to the accumulation of cotton in the areas around the doffer columns.

DETAILED DESCRIPTION OF THE PREFERRED EMBODIMENT

Figure 1:
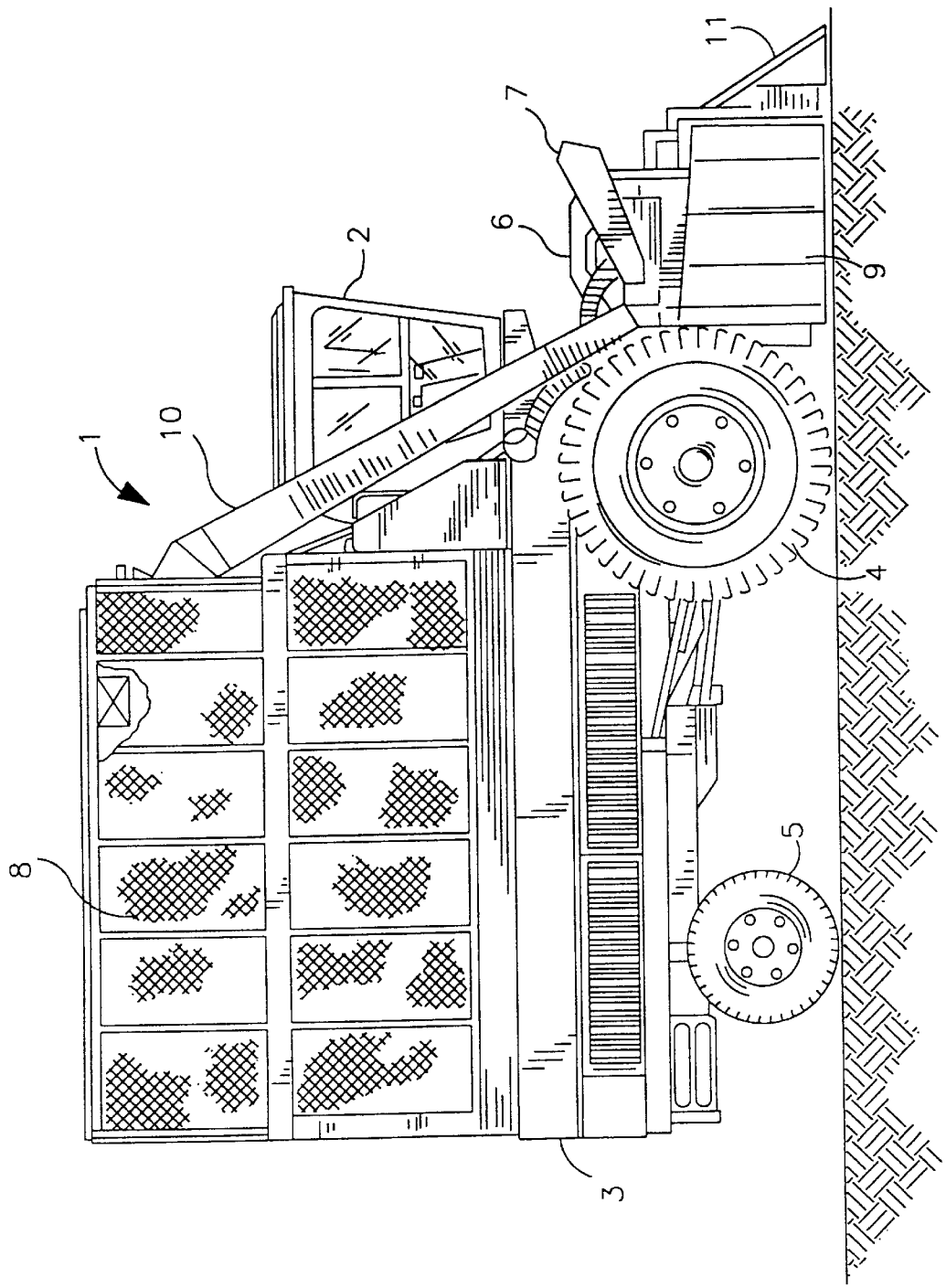
FIG. 1 is a side view of a cotton picker/harvester with a cotton basket mounted thereto.

FIG. 1 is a side view of a mechanized cotton harvester 1. The harvester includes an operator station 2 from which an operator can control the operation of the harvester 1. The harvester 1 includes necessary powertrain components such as an engine and transmission (not shown) in appropriate compartments. Harvester 1 also includes a pair of driven wheels, indicated in FIG. 1 by reference numeral 4, and a pair of steering wheels, indicated in FIG. 1 as reference numeral 5. The cotton harvester 1 is also equipped with a picking unit 6 and a collection basket 8.

Figure 2:
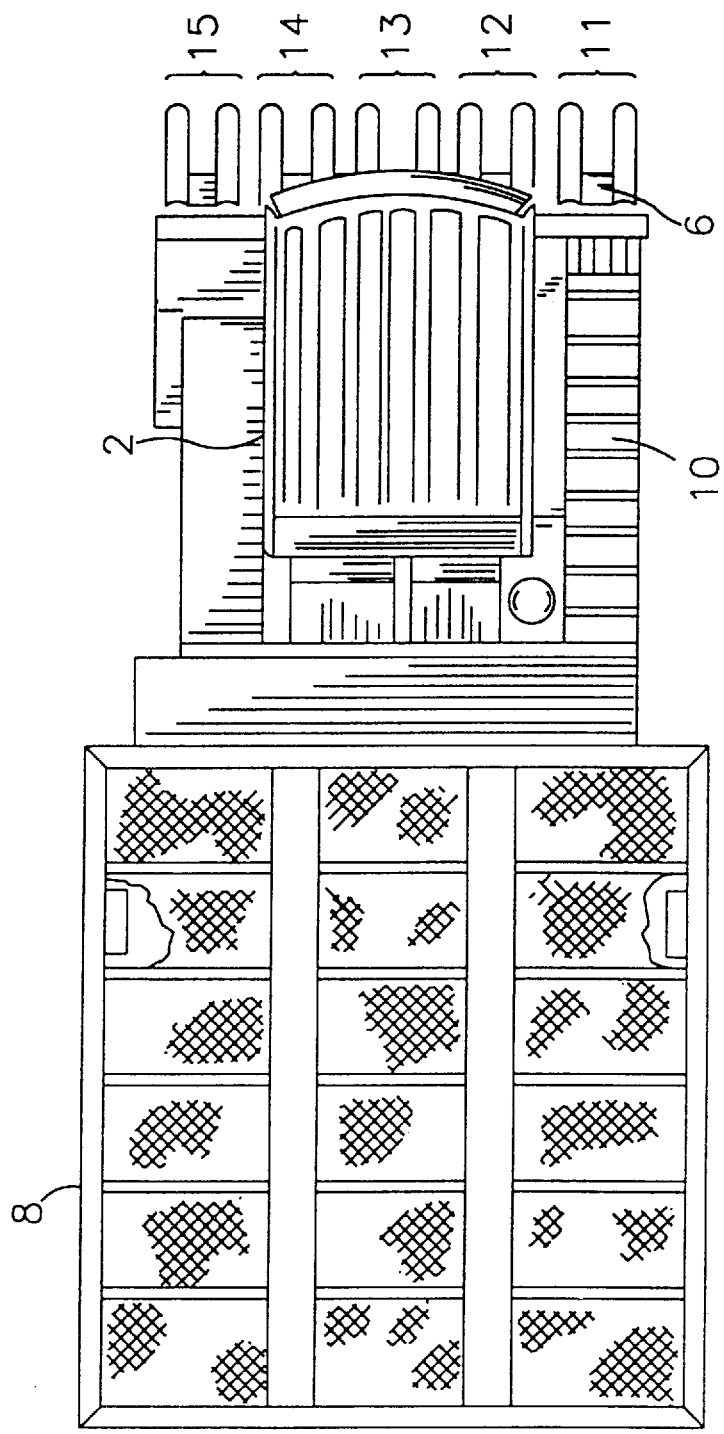
FIG. 2 is a top view of a cotton picker/harvester with a cotton basket mounted thereto illustrating a picking unit with five individual row units.

FIG. 2 is a top view of harvester 1. The top of the operator's station 2 is illustrated along with collection basket 8, picking unit 6, row units 11 through 15 and air chute 10. The five row units 11–15 are generally illustrated by their respective pairs of stalk lifters at the front of the picking unit.

Figure 3:
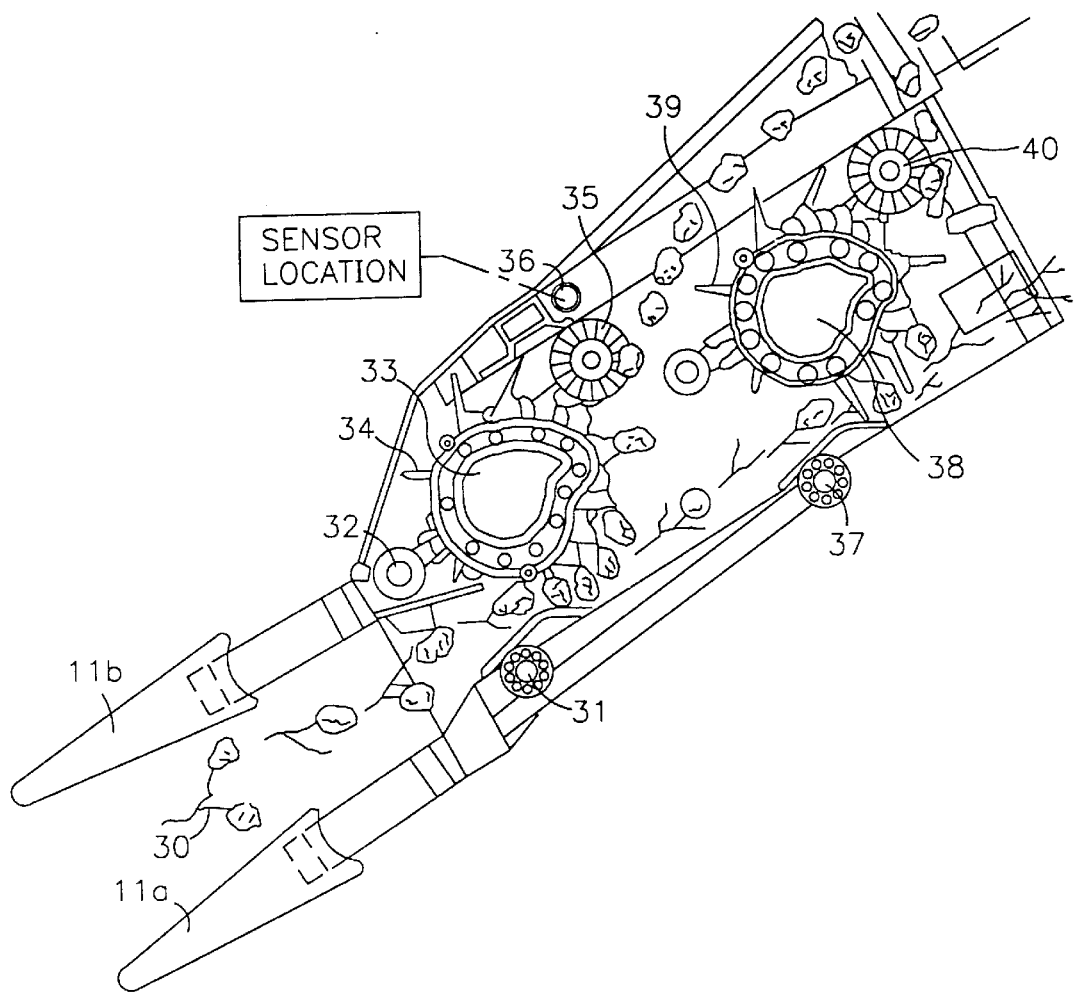
FIG. 3 is a cut-away top view of a row unit.

FIG. 3 is a cut-away top view of a row unit, such as unit 11. Row unit 11 includes a pair of stalk lifters 11a and 11b which direct cotton stalks, such as stalk 30, into the row unit. Row unit 11 also includes a pair of picker drums 33 and 38, each of which rotates around a vertical axis. Each picker drum is equipped with numerous spindles, such as spindles 34 and 39, each of which is connected to the picker drums and rotates around a moving, generally horizontal axis. Row unit 11 is also equipped with a pair of doffer columns 35 and 40. Finally, row unit 11 includes other necessary equipment such as spindle moistener column 32.

As the cotton stalks enter row unit 11, the forward picker drum 33 rotates around its vertical axis and the spindles thereon rotate around horizontal axes. As a rotating spindle comes in contact with cotton, the cotton is wound around the spindle. The cotton on the spindle is then separated from the stalk as front picker drum 33 rotates the spindles towards the front doffer column 35. Meanwhile, the cotton stalks are directed in a generally rearward path towards the rear picker drum 38 which, in the same manner as the front picker drum, removes the cotton from any stalks which were not picked by the first drum. The bare cotton stalks then exit the row unit at the rear.

As noted above, the spindles containing cotton are rotated towards the doffer columns 35, 40 by the rotation of the picker drums 33, 38. The doffer columns strip the cotton from the spindles and direct the separated cotton into an air stream where the cotton is ultimately directed to the cotton basket 8. After the doffer columns strip the cotton from the spindles, the continued rotation of the picker drum causes the spindles to move towards moistener column 32 where the spindles are moistened and then positioned to contact additional cotton stalks.

During operation of the row unit, the air stream may become blocked by cotton, cotton stalks or other debris. This blockage, in turn, causes separated cotton to accumulate in the spaces and areas surrounding the doffer columns. Other breakdowns or malfunctions in the feeding mechanisms may also cause separated cotton to become lodged in the areas surrounding the doffer columns. The blockage or malfunctions associated with the air stream or other feeding mechanisms may have a greater effect on the front picker drum in a multipicker drum row unit although these conditions may also occur in the rear picker drum. Thus, as described below, while the front doffer column is monitored in the illustrated embodiment, it should be understood that either the front or rear or both doffer columns could be monitored if desired. Referring to FIG. 3, if such a malfunction or blockage occurs, cotton will accumulate in the areas near doffer column 35 as it strips cotton from the spindles on picking drum 33. In order to detect an undesirably high accumulation of cotton in the doffer column areas, a preferred embodiment of the present invention utilizes a sensor 36 which is mounted in proximity to doffer column 35.

As illustrated in FIG. 3, sensor 36 may be mounted to the row unit in a location that permits sensor 36 to contact cotton accumulation on or in the areas of doffer column 35. Generally, the sensor 36 is mounted in a manner which permits the tubular-shaped sensor to rotate around a non-concentric vertical axis which is parallel to the axis of the doffer column. The spacing between the axis of the doffer column and the axis of the sensor 36 may be fixed at the time of installation of the sensor and is selected such that cotton accumulation on or in the areas of the sensor will contact the sensor.

Figure 4:
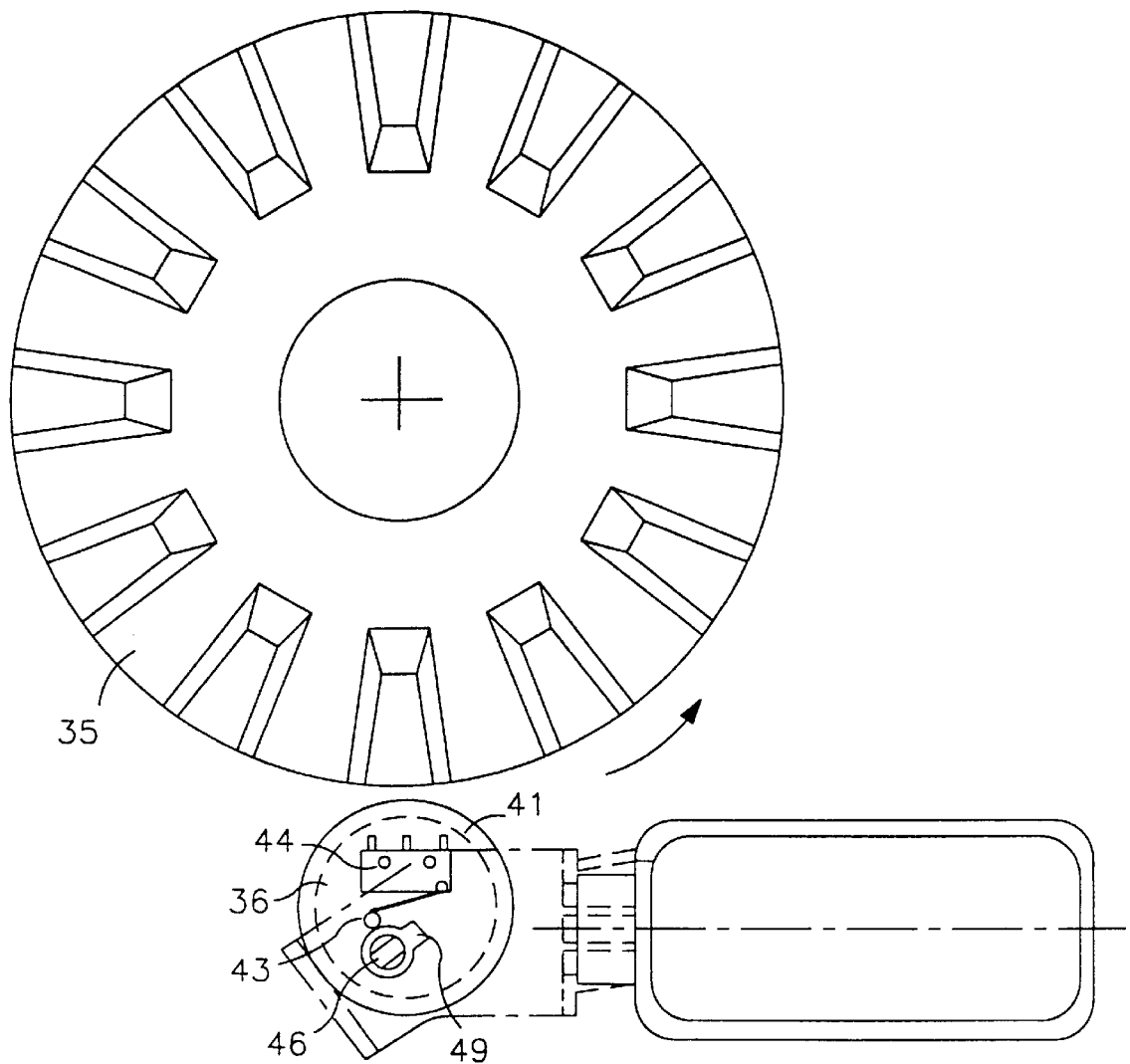
FIG. 4 is a top view of the present invention.
Figure 5:
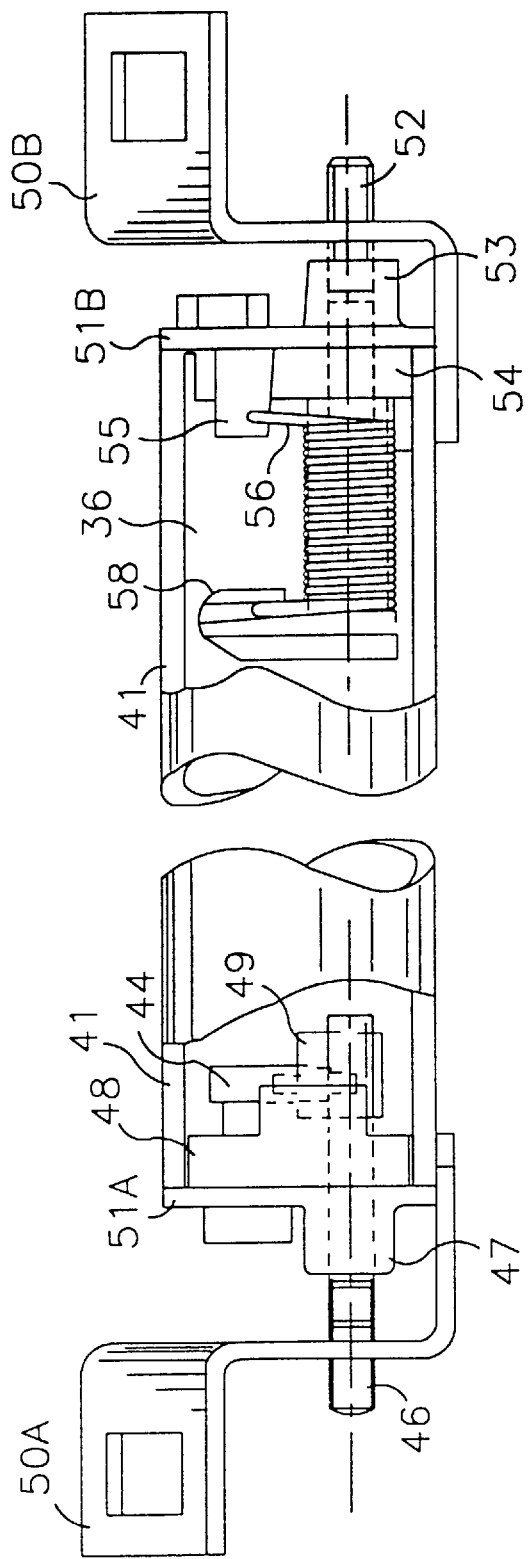
FIG. 5 is a side view of the present invention.

FIGS. 4 and 5 respectively illustrate cut-away top and side views of a preferred embodiment of sensor 36. The top view of FIG. 4 illustrates the top internal components of a sensor including a switch assembly 44. The side view of FIG. 5 illustrates the external and internal components of the sensor 36. The external components include tube 41, brackets 50a and 50b, stub shafts 46 and 52, bearings 47 and 53, and sealing surfaces 51a and 51b. The internal components of the sensor 36 include switch 44, switch mounting surface 48, impact plate 49, biasing spring 56, and spring mounting surfaces 55 and 58. Sealing surfaces 51a and 51b are attached to the ends of tube 41 and isolate the internal components of the sensor from the external environment. It should be understood that the illustrated components are merely exemplary, and other equivalent components may be substituted as one skilled in the art would readily recognize. For example, switch 44 preferably is a microswitch, but it may be any other suitable type of switch, such as a mercury switch or reed switch and, in fact, may be a solid state device, such as a Hall effect sensor mounted with a magnet such that there would be relative movement therebetween during operation.

The sensor 36 is mounted to the row unit via brackets 50a and 50b which are further attached to the tube assembly. Tube 41 is connected to stub shafts 46 and 52 via bearings 47 and 53 which permit the tube 41 to rotate around the non-concentric axis defined by stub shafts 46 and 52. The axis of rotation is located off-center of tube 41 and thereby permits an eccentric rotation of tube 41.

The initial angular position of tube 41 is set by the arrangement of biasing spring 56 and its associated mounting components. One end of biasing spring 56 is attached to spring mounting surface 58 which is fixedly attached to stub shaft 52. Consequently, this end of the biasing spring 56 is fixedly attached with respect to the row unit. The other end of biasing spring 56 is attached to spring mounting surface 55 which is fixedly attached to the tube 41. Thus, one end of the biasing spring is fixed with respect to the row unit and the other end is fixed with respect to the tube 41. The biasing spring therefore forces the tube to rotate into a set position with respect to the row unit. To prevent over-rotation of the tube by the biasing spring, positioning stops (not shown) are employed.

At one end of tube 41, the switch 44 is fixedly mounted to a surface 48 attached to tube 41. An impact plate 49 is fixedly mounted to stub shaft 46 and is in contact with switch arm 43 of switch 44 (FIG. 4). Thus, the switch is connected to tube 41 and rotates with the tube whereas impact plate 49 is fixed with respect to the row unit.

Given the foregoing explanation of the components of the sensor, the operation of the sensor may now be explained. Turning to FIG. 4, it is shown that tube 41 is spaced apart from front doffer column 35 and may rotate on an axis which is parallel to the axis of the doffer column. The tube 41 is set in an initial angular position by the operation of the above-described biasing spring. If cotton accumulates on or in the areas of the rotating doffer column 35, the cotton will contact tube 41 and thereby rotate tube 41 in an eccentric arc. As shown in FIG. 4, the doffer column rotates in a counter-clockwise direction and, consequently, tube 41 will rotate in a clockwise direction. In a preferred embodiment, tube 41 is mounted on an eccentric axis such that tube 41 will rotate in response to either a displacement type force or a rotating type force.

As tube 41 rotates through its eccentric path, the internal switch 44 and switch arm 43, which is in contact with impact plate 49, will also rotate. Impact plate 49, however, is fixed to stub shaft 46 and will not rotate. Thus, switch arm 43 will move with respect to impact plate 49 and, depending on the geometry of impact plate 49, the angle of the switch arm with respect to the switch will decrease. At a preset amount of angular rotation, switch 44 will close. Bump stops (not shown) are employed to prevent over-rotation of tube 41 and potential damage to the switch.

The closure of the switch will cause the sensor to output an alert signal which can be used, among other things, to alert an operator that the doffer column area has accumulated an undesirably high amount of cotton. The signal output from the switch also could be fed into control circuitry or computer components or the like which could cause additional events to occur such as slowing machine ground speed or shutting down the entire picking unit or select row units within the picking unit.

Finally, after the operator (or other means) removes the cotton build-up from the doffer column area, tube 41 will automatically return to its initial position as a result of the force supplied by biasing spring 56. Correspondingly, switch 44 will return to its initial non-closed position and the alert signal will not be output by switch 44.

As mentioned above, it is contemplated that a variety of switches could be used in place of switch 44. Thus, the switch need not be a two position switch. Instead, for example, switch 44 could be replaced by a multi-position/multi-pole switch which would output different signals depending on the amount of angular rotation of the sensor. Thus, the switch would output a first signal based on a first level of cotton build-up, a second signal based on a second level of cotton build-up and so on. A further switch example would be an encoder and counter combination which output signals representative of the distance traveled by tube 41 from its initial position. These additional switches and the like are useful for providing information to the operator about the amount of accumulation.

Other objects, features, and advantages of the present invention will be more readily apparent upon reading the above description. It should be understood that the detailed description and specific embodiment are given by way of illustration only, since various changes and modifications within the spirit and scope of the invention will become apparent to those skilled in the art from this detailed description.

What is claimed is:

1. A sensor for detecting when the accumulation of material in an area has exceeded a predetermined threshold comprising:

a generally cylindrically-shaped member eccentrically mounted on an axis adjacent the area and capable of angular rotation about said axis;

a biasing spring mounted to said member such that said member is forced to an initial angular position when no material has accumulated in said area; and a switch cooperating with said member that changes state after said member rotates a predetermined angular distance away from said initial angular position in response to force applied to the member by material that accumulates in said area.

2. A sensor in accordance with claim 1 wherein said switch is mounted to said member and includes a switch arm in contact with a fixed surface such that rotation of said member causes said switch arm to move relative to the switch and will cause the switch to change states as said member rotates through a predetermined angular distance.

3. A sensor in accordance with claim 2 wherein said switch and switch arm are located within said generally cylindrically shaped member.

4. A sensor in accordance with claim 1 wherein said switch is a microswitch.

5. A sensor in accordance with claim 1 wherein said material that accumulates in said area is cotton.

6. A method for detecting when material that accumulates in an area has exceeded a predetermined threshold comprising the steps of:

positioning a generally cylindrically shaped member and a switch attached to said member in a first angular position adjacent the area;

rotating said member about a vertical axis in an eccentric arc in response to a force applied to said member by material that accumulates in said area; and changing the state of said switch as said member rotates to a second angular position.

7. The method of claim 6 wherein the step of positioning a generally cylindrically shaped member comprises applying the force of a biasing spring to said member to cause said member to rotate about its axis into said first angular position and thereby maintain the position of said member in said first angular position until said material that accumulates in said area applies sufficient force to said member to overcome the force of the biasing spring.

* * * * *

UNITED STATES PATENT AND TRADEMARK OFFICE
CERTIFICATE OF CORRECTION

PATENT NO. : 5,819,512
DATED : October 13, 1998
INVENTOR(S) : Ronald W. Steffen, Ernie J. Poanie, David E. Steffen It is certified that error appears in the above-identified patent and that said Letters Patent is hereby corrected as shown below:

On the title page:
Item
[75] Inventors: "Ronald E. Steffen" should read -- Ronald W. Steffen --.

Signed and Sealed this

Twenty-third Day of February, 1999

Attest:

Q. TODD DICKINSON

Attesting Officer

Acting Commissioner of Patents and Trademarks